(12) United States Patent
Manepalli et al.

(10) Patent No.: US 10,349,280 B2
(45) Date of Patent: *Jul. 9, 2019

(54) SECURE CONNECTION RELEASE AND NETWORK REDIRECTION

(71) Applicant: Apple Inc., Cupertino, CA (US)

(72) Inventors: Venkateswara Rao Manepalli, Sunnyvale, CA (US); Srinivasan Nimmala, San Jose, CA (US); Farouk Belghoul, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/033,282

(22) Filed: Jul. 12, 2018

(65) Prior Publication Data

US 2018/0324592 A1 Nov. 8, 2018

Related U.S. Application Data

(63) Continuation of application No. 15/671,614, filed on Aug. 8, 2017, now Pat. No. 10,051,473.

(Continued)

(51) Int. Cl.
*H04W 76/00* (2018.01)
*H04W 12/08* (2009.01)
(Continued)

(52) U.S. Cl.
CPC .......... *H04W 12/08* (2013.01); *H04W 12/06* (2013.01); *H04W 36/0061* (2013.01);
(Continued)

(58) Field of Classification Search
CPC ..... H04W 12/08; H04W 76/18; H04W 76/30; H04W 12/06; H04W 36/0061;
(Continued)

(56) References Cited

U.S. PATENT DOCUMENTS 7,565,145 B2 7/2009 Gallagher et al.
8,175,058 B2 5/2012 Oba et al.
(Continued)

FOREIGN PATENT DOCUMENTS

JP 2010135866 A 6/2010
JP 2013168035 A 8/2013
(Continued)

OTHER PUBLICATIONS

3GPP, 3rd Generation Partnership Project; Technical Specification Group Radio Access Network; Evolved Universal Terrestrial Radio Access (E-UTRA); Radio Resource Control (RRC); Protocol specification (Release 13); 3GPP TS 36.331 V13.2.0; Jul. 11, 2016; 623 pages.

(Continued)

*Primary Examiner* — Pakee Fang
(74) *Attorney, Agent, or Firm* — Meyertons Hood Kivlin Kowert and Goetzel PC; Jeffrey C. Hood; Joel L. Stevens (57) ABSTRACT

This disclosure relates to techniques for securely performing connection release and network redirection in a wireless communication system. A wireless device may establish a radio resource control (RRC) connection with a first cell. The wireless device may receive a RRC connection release message from the first cell. The RRC connection release message may include an indication to redirect the wireless device to a second cell. The RRC connection with the first cell may be released. It may be determined whether security has been established with the first cell when the indication to redirect the wireless device to the second cell is received. A new serving cell may be selected based at least in part on whether security has been established with the first cell when the indication to redirect the wireless device to the second cell is received.

20 Claims, 4 Drawing Sheets

Related U.S. Application Data (60) Provisional application No. 62/374,257, filed on Aug. 12, 2016.

(51) Int. Cl.
*H04W 36/00* (2009.01)
*H04W 36/08* (2009.01)
*H04W 48/16* (2009.01)
*H04W 12/06* (2009.01)
*H04W 76/18* (2018.01)
*H04W 76/30* (2018.01)
*H04W 36/38* (2009.01)

(52) U.S. Cl.
CPC ........... *H04W 36/08* (2013.01); *H04W 48/16* (2013.01); *H04W 76/18* (2018.02); *H04W 76/30* (2018.02); *H04W 36/38* (2013.01)

(58) Field of Classification Search
CPC ... H04W 36/08; H04W 76/027; H04W 76/06; H04W 48/16
See application file for complete search history.

(56) References Cited

U.S. PATENT DOCUMENTS

| | | |
|---|---|---|
| 8,599,788 B2 | 12/2013 | Song et al. |
| 8,731,194 B2 | 5/2014 | Hahn et al. |
| 2012/0096519 A1 | 4/2012 | Alanara |
| 2015/0092630 A1 | 4/2015 | Lin |
| 2016/0234729 A1 | 8/2016 | Achtari et al. |
| 2017/0118203 A1 | 4/2017 | Wirtanen |

FOREIGN PATENT DOCUMENTS

| | | |
|---|---|---|
| KR | 1020100071775 A | 6/2010 |
| KR | 1020120006659 A | 1/2012 |
| KR | 101451001 B1 | 10/2014 |
| KR | 1020140121693 A | 10/2014 |

OTHER PUBLICATIONS

Notice of Preliminary Rejection (Non-Final), Korean Patent Application No. 10-2017-0101549, dated Sep. 13, 2018, three pages.
Notice of Allowance, Korean Patent Application No. 10-2017-0101549, dated Mar. 19, 2019, two pages.

SECURE CONNECTION RELEASE AND NETWORK REDIRECTION

PRIORITY INFORMATION

This application is a continuation of U.S. patent application Ser. No. 15/671,614, entitled "Secure Connection Release and Network Redirection," filed Aug. 8, 2017, which claims priority to U.S. provisional patent application Ser. No. 62/374,257, entitled "Secure Connection Release and Network Redirection," filed Aug. 12, 2016, which are both hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, including to apparatuses, systems and methods for securely performing connection release and network redirection in wireless communication systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, NEV-DO, HRPD, eHRPD), IEEE 802.11 (WLAN or Wi-Fi), IEEE 802.16 (WiMAX), Bluetooth, and others.

SUMMARY

Embodiments are presented herein of apparatuses, systems, and methods for securely performing connection release and network redirection in wireless communication systems.

As wireless communication technologies have evolved, so too have security and authentication techniques. In some cases, less stringent/less effective authentication mechanisms used by older/legacy wireless communication technologies may be exploited by unauthorized parties, e.g., for eavesdropping or other purposes that may be privacy-invasive. Further, if a wireless network's redirection policy is not carefully crafted, it may be possible for an unauthorized party to redirect users' wireless devices to use such less-secure wireless communication technologies, e.g., even when there are more secure wireless communication technology options available to those devices.

Accordingly, it may (at least in some instances) be desirable to configure network redirection policies in a manner that can avoid such unauthorized redirections, and/or to configure wireless devices to avoid or discard potentially unauthorized redirections.

For example, according to some of the techniques described herein, a wireless device that receives an indication (e.g., in a RRC connection release message, in a RRC connection reject message, etc.) to redirect the wireless device to a cell that operates according to a wireless communication technology that is considered insufficiently secure when the wireless device has not yet performed authentication with its current cell may choose not to observe the redirection indication. The wireless device may instead perform a cell re-selection procedure to determine a new serving cell for the wireless device. This may help the wireless device avoid complying with redirection indications received from unauthorized parties.

As another possibility, a cellular base station may be configured to not redirect a wireless device to a cell that operates according to a wireless communication technology that is considered insufficiently secure unless/until authentication with the wireless device has been performed. Thus, if the cellular base station wished to provide a redirection indication to a wireless device when authentication with the wireless device has not yet been performed, the cellular base station might choose to indicate to the wireless device to redirect to a cell that operates according to a wireless communication technology that is considered sufficiently secure. Alternatively, if the cellular base station wished to provide a redirection indication to a wireless device when authentication with the wireless device has not yet been performed, and the cellular base station chooses to indicate to the wireless device to redirect to a cell that operates according to a wireless communication technology that is considered insufficiently secure, the cellular base station may undertake authentication with the wireless device prior to providing the redirection indication, e.g., so that the wireless device can be more confident that the redirection indication is being received from an authorized party.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3 GPP: Third Generation Partnership Project
3 GPP2: Third Generation Partnership Project 2
RAN: Radio Access Network
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
E-UTRAN: Evolved UMTS Radio Access Network or Evolved Universal Radio Access Network
RRC: Radio Resource Control
NW: Network Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20

MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
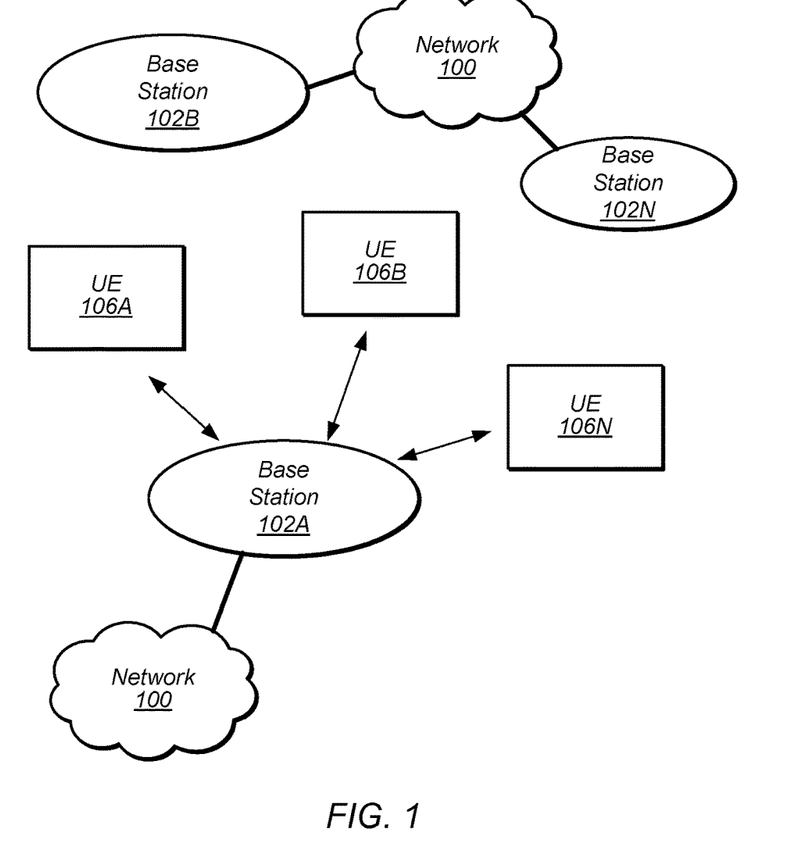
FIG. 1 illustrates an exemplary (and simplified) wireless communication system, according to some embodiments.
Figure 2:
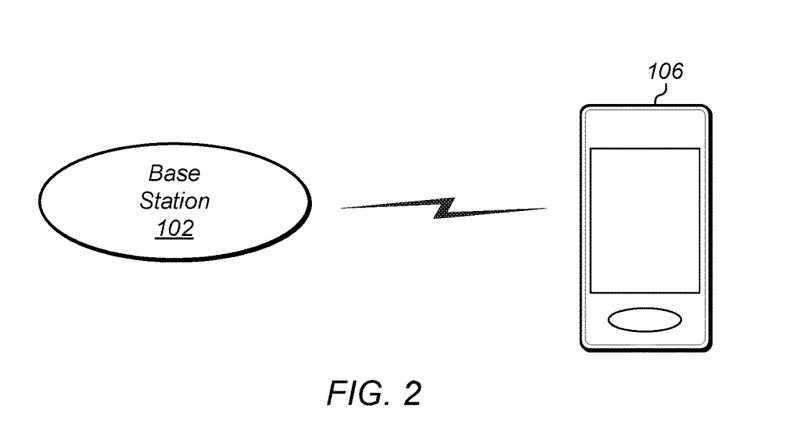
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for secure connection release and network redirection, e.g., according to the method of FIG. 5. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
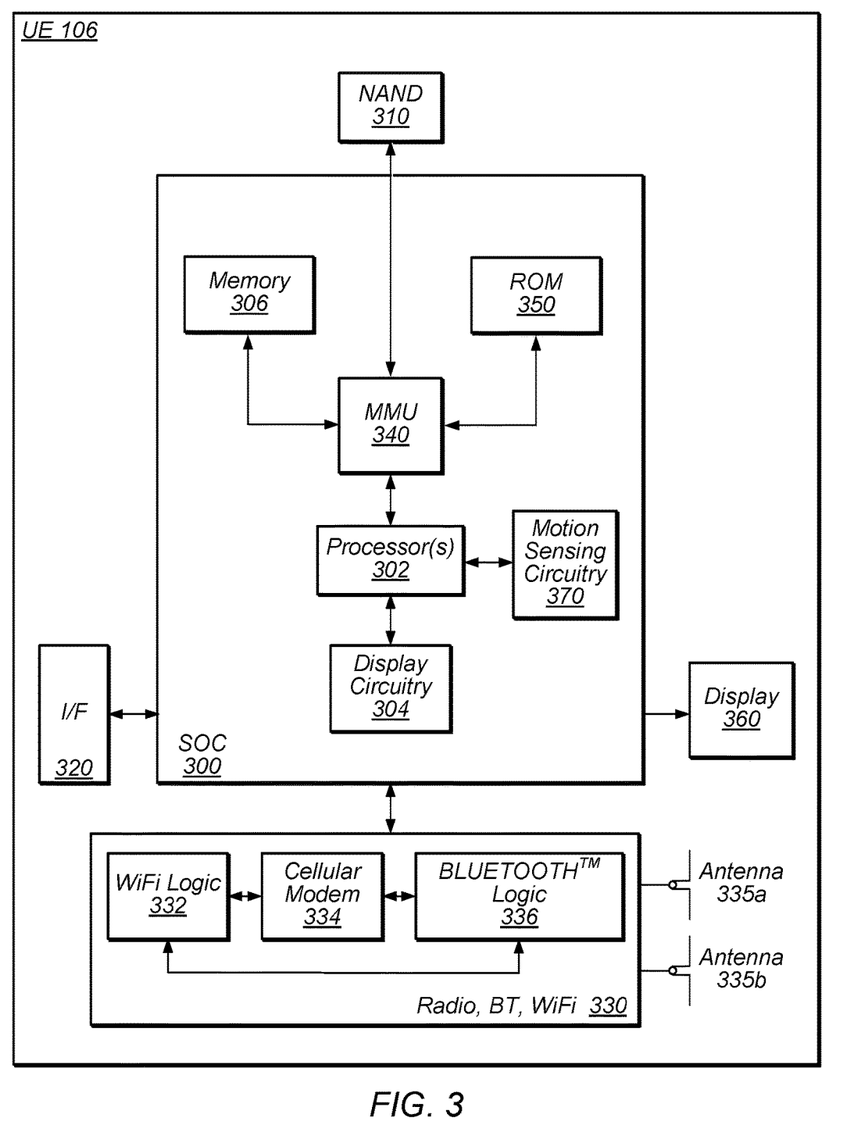
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106 may include various types of memory (e.g., including NAND flash 310), a connector interface 320 (e.g., for coupling to a computer system, dock, charging station, etc.), the display 360, and wireless communication circuitry 330 (e.g., for GSM, UMTS, LTE, LTE-A, NR, CDMA2000, Bluetooth, Wi-Fi, NFC, GPS, etc.).

The UE device 106 may include at least one antenna, and in some embodiments multiple antennas 335a and 335b, for performing wireless communication with base stations and/or other devices. For example, the UE device 106 may use antennas 335a and 335b to perform the wireless communication. As noted above, the UE device 106 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies.

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
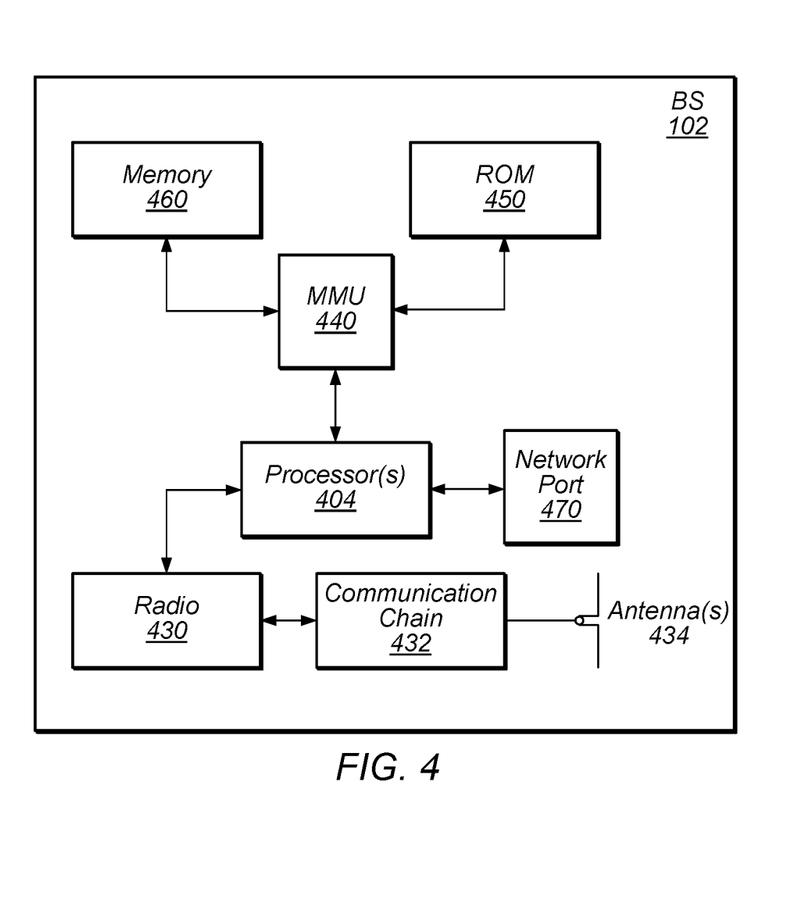
FIG. 4 illustrates an exemplary block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
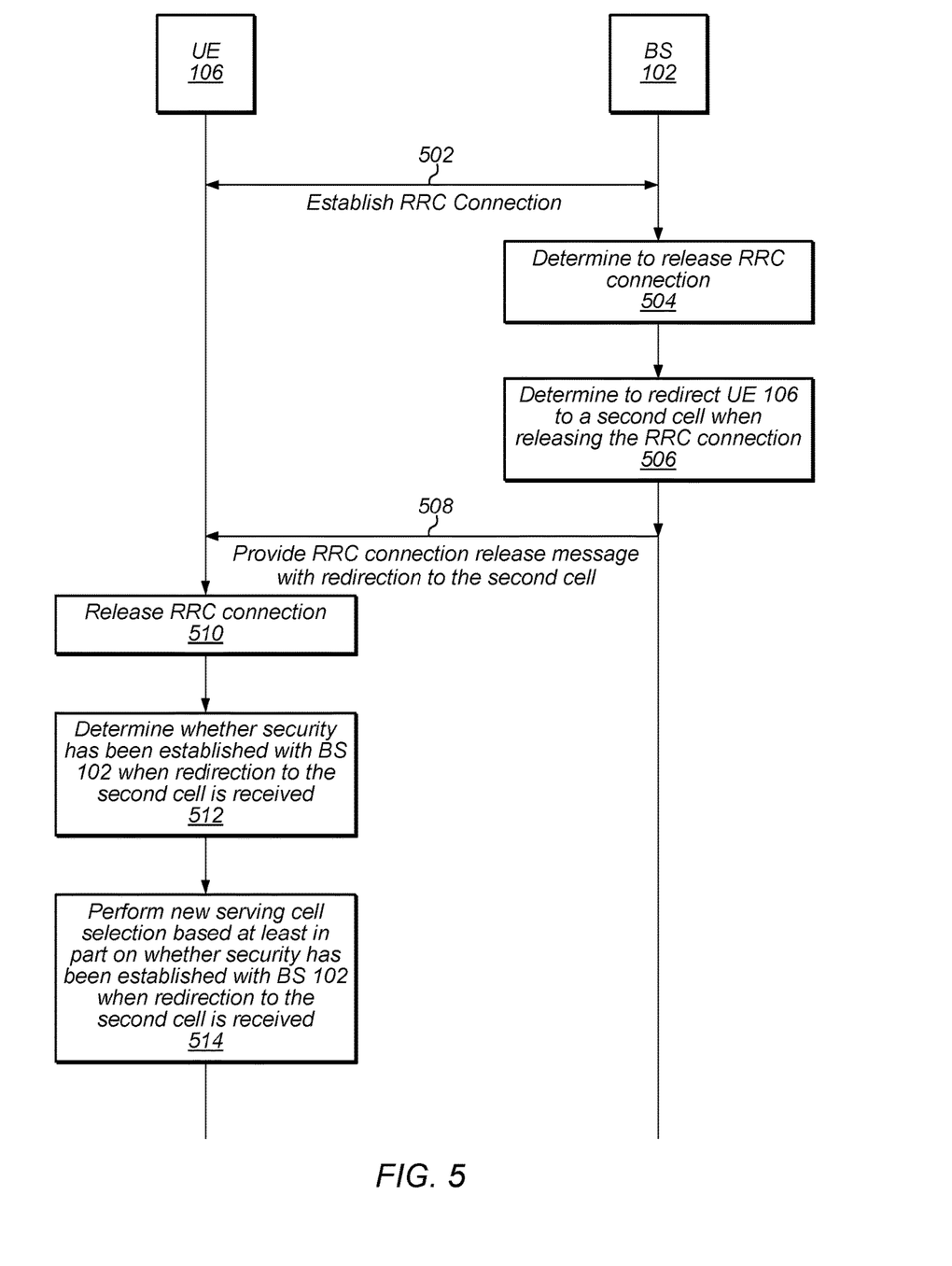
FIG. 5 is a communication flow diagram illustrating an exemplary method for securely performing RRC connection release and network redirection, according to some embodiments.

FIG. 5—Secure Connection Release and Network Redirection

Radio access networks that operate according to different generations of cellular communication continue to exist and provide service to subscriber wireless devices, for a variety of reasons, such as to provide a greater wireless service coverage areas, to provide service to legacy devices, to provide bridge service while newer generation technology is being deployed, etc. As cellular communication techniques have evolved, security and authentication procedures have also developed, such that newer generations of cellular communication technology (e.g., LTE, UMTS) may be more secure than older generations of cellular communication technology (e.g., GSM). Accordingly, it is possible for unauthorized parties to attempt to take advantage of lower security levels of certain (e.g., older) cellular communication technologies by redirecting wireless devices in an area to such a less-secure cellular communication technology and eavesdropping on communications performed using the less-secure cellular communication technology.

For example, it may be possible for an unauthorized party to set up an LTE or UMTS base station that ostensibly provides a cell, and when a wireless device attaches to the cell, for the base station to immediately release the connection and include an indication to redirect the wireless device to a GSM cell, even though no security procedures may have been performed between the cell and the wireless device (e.g., since the unauthorized party's cell may not be able to successfully perform mutual authentication with the wireless device). If the wireless device redirects to the GSM cell as indicated, the unauthorized party may be able to access calls and/or data exchanges performed by the wireless device using the GSM cell.

FIG. 5 is a communication/signal flow diagram illustrating one possible scheme for securely performing radio resource control (RRC) connection release with redirection between wireless devices and base stations, that may help prevent such unauthorized redirections, at least according to some embodiments. The scheme shown in FIG. 5 may be used in conjunction with any of the computer systems or devices shown in the above Figures, among other devices. In various embodiments, some of the elements of the scheme shown may be performed concurrently, in a different order than shown, may be substituted for by other elements, or may be omitted. Additional elements may also be performed as desired. As shown, the scheme may operate as follows.

In 502, a UE 106 and a BS 102 may establish an RRC connection. The RRC connection may be established using communication techniques according to or based at least in part on LTE, at least according to some embodiments. As another possibility, the RRC connection may be established using communication techniques according to or based at least in part on UMTS. Any of various other wireless communication technologies may also/alternatively be used, in some embodiments. The RRC connection may be scheduled in advance or unscheduled. The UE 106 may perform a random access channel (RACH) procedure in order to establish the RRC connection. Alternatively, the BS 102 may page the UE 106 at a scheduled time, and the UE 106 may respond to the paging message and exchange RRC connection establishment parameters with the BS 102 to establish the scheduled RRC connection. The BS 102 may provide a first cell, which may act as a serving cell to the UE 106.

Once the RRC connection is established, the UE 106 and the BS 102 may communicate data, potentially including uplink data communication from the UE 106 to the BS 102, and/or downlink data communication from the BS 102 to the UE 106. The UE 106 and the BS 102 may also perform one or more security procedures (e.g., mutual authentication) to establish security between the UE 106 and the BS 102 (e.g., if the BS 102 is an authorized cell provided by a cellular service provider). Alternatively, it may also be possible that the UE 106 and the BS 102 do not perform security procedures or exchange data (e.g., if the BS 102 is not an authorized cell provided by a cellular service provider, or potentially for a variety of possible reasons even if the BS 102 is an authorized cell provided by a cellular service provider).

In 504, the BS 102 may determine to release the RRC connection. The BS 102 may determine to release the RRC connection for any of various possible reasons, potentially including but not limited to load balancing by the BS 102, expiration of a RRC connection release timer, subscription characteristics of the wireless device, etc.

In 506, the BS 102 may determine to redirect the UE 106 to a second cell when releasing the RRC connection. The second cell may be another cell that operates according to the same RAT as the BS 102 or may operate according to another radio access technology (e.g., may be an intra-RAT or inter-RAT cell redirection), and may be selected as a cell to which to redirect the UE 106 for any of various possible reasons (e.g., network load balancing, relative priority levels of available neighbor cells, RATs of available neighbor cells, subscription characteristics of the wireless device, etc.).

According to some embodiments, the BS 102 may provide redirection to another cell only if security has been established between the BS 102 and the UE 106, and/or may determine to perform security procedures to establish security between the BS 102 and the UE 106 prior to providing an indication to redirect the UE 106 to another cell. This may help prevent the possibility that the UE 106 discards the redirection indication as being insecure. As another possibility, the BS 102 may require that security be established between the BS 102 and the UE 106 before providing redirection indications to certain RATs (e.g., just to GSM, to both GSM and UMTS, etc.), but not others (e.g., not to NR cells, not to LTE cells, not to UMTS cells, not to any of NR/LTE/UMTS cells, etc.). In other words, the requirement that security be established between the BS 102 and the UE 106 before providing redirection indications may apply only to certain types of redirection indications, e.g., depending on the security/authentication procedures used by the cell (or more generally type of cell) to which the redirection indication relates, as desired by the base station operator and/or as specified by (e.g., NR, LTE, UMTS, etc.) specification documents.

In 508, the BS 102 may provide an RRC connection release message to the UE 106. The RRC connection release message may include an indication to redirect the UE 106 to the second cell.

In 510, the UE 106 may release the RRC connection with the BS 102. This may include removing/deleting context information for the RRC connection, entering an idle mode, and/or any of various other possible actions, at least according to some embodiments.

In 512, the UE 106 may determine whether security has been established with the BS 102 when the indication to redirect the UE 106 to the second cell is received. For example, the UE 106 may determine whether the UE 106 and the BS 102 have performed mutual authentication, e.g., to confirm that the BS 102 is an authorized base station provided by a cellular service provider and that the UE 106 is permitted to access the network to which the BS 102 belongs.

In 514, the UE 106 may perform new serving cell selection based at least in part on whether security has been established with the BS 102 when the indication to redirect the UE 106 to the second cell is received.

According to some embodiments, the UE 106 may select the second cell as indicated if security has been established with the BS 102 when the indication to redirect the UE 106 to the second cell is received. For example, in this case the UE 106 may be confident that the redirection is authorized, since the UE 106 may have successfully established security with the BS 102.

The UE 106 may also select the second cell as indicated even if security has not been established with the BS 102 when the indication to redirect the UE 106 to the second cell is received, at least in some instances. For example, if the second cell operates according to a RAT that is considered secure, the UE 106 may select the second cell as indicated even if security has not been established with the BS 102 when the indication to redirect the UE 106 to the second cell is received, since it may be possible to establish reliable security with the second cell.

At least in some instances, however, the second cell may not be selected (i.e., the indication to redirect the UE 106 to the second cell may be discarded) if security has not been established with the first cell when the indication to redirect the wireless device to the second cell is received. For example, if the second cell operates according to GSM or otherwise operates according to a RAT that is considered insecure or insufficiently secure, the wireless device may determine not to select the second cell, e.g., since it may be uncertain whether the UE 106 can trust the BS 102 attempting to redirect the UE 106 to the second cell and it may not be possible to establish reliable security with the second cell. In this case, the UE 106 may perform a cell re-selection procedure to determine the new serving cell to which the UE 106 will attach.

Additionally, at least according to some embodiments, the UE 106 may take one or more measures to prevent re-selecting to the first cell if the UE 106 determines to discard the indication to redirect to the second cell based on security not having been established with the first cell when the indication to redirect the UE 106 to the second cell is received and/or based on the security level and/or RAT of the second cell. For example, if the first cell is operated by an unauthorized party with an intention of redirecting wireless devices to a less secure radio access technology, it may be desirable to avoid reselecting to the same cell as that cell may not be usable to actually obtain service. For example, the UE 106 may bar itself from camping on the first cell for a limited or indefinite period of time based on security not having been established with the first cell when the indication to redirect the UE 106 to the second cell is received and/or based on the security level and/or RAT of the second cell. As another possibility, the UE 106 may bar itself from camping on the frequency on which the first cell operates for a limited or indefinite period of time based on security not having been established with the first cell when the indication to redirect the UE 106 to the second cell is received and/or based on the security level and/or RAT of the second cell. Such a more broad restriction may be preferred, at least in some instances, if for example it is suspected or considered possible that multiple cells in the vicinity of the UE 106 using the same frequency are being used for similar unauthorized purposes.

According to some embodiments, the UE 106 may further declare radio link failure (RLF) based on security not having been established with the first cell when the indication to redirect the UE 106 to the second cell is received and/or based on the security level and/or RAT of the second cell. This may also result in cell and/or frequency barring for the first cell, at least while the UE 106 performs cell selection and connection re-establishment. In such a case, the UE 106 may perform a tracking area update (TAU) procedure with its new serving cell after cell reselection, e.g., based on having declared RLF. This may help ensure that the UE 106 is synchronized with the proper network (e.g., the network to which the UE 106 is subscribed or otherwise has access according to the subscription characteristics of the UE 106) rather than an unauthorized network.

As still another possibility, the UE 106 may also or alternatively bar itself from camping on the second cell (and/or the frequency on which the second cell is deployed) for a limited or indefinite period of time based on security not having been established with the first cell when the indication to redirect the UE 106 to the second cell is received and/or based on the security level and/or RAT of the second cell. For example, if the UE 106 determines that the indication to redirect the UE 106 to the second cell may not be trustworthy, it may be beneficial to prevent the possibility that the UE 106 could reselect to the second cell as part of its cell reselection procedure even if the indication to redirect the UE 106 to the second cell is discarded.

Note that while the method of FIG. 5 describes techniques for securely handling connection release with network redirection, according to some embodiments, similar considerations may apply for RRC connection rejection messages as well. For example, in UMTS, an indication to redirect a UE to another cell may be provided when a RRC connection is rejected by a cell. Such a redirection indication that is received when security procedures have not yet been performed and security has not been established may be from an unauthorized source. Accordingly, a wireless device receiving a RRC connection rejection with a redirection to a RAT that is considered insufficiently secure (e.g., GSM), the redirection may not be handled, and the device may move on from the cell that provided the RRC connection reject to find a new cell.

For example, a wireless device that receives a RRC connection rejection message with redirection to another cell may select a new serving cell based at least in part on the radio access technology of the cell to which redirection is indicated, and/or on the security and authentication procedures associated with the indicated cell. The wireless device may select the indicated cell if the indicated cell operates according to a radio access technology that is considered sufficiently secure, but the indication may be discarded and a cell re-selection procedure may be performed if the indicated cell operates according to a radio access technology that is considered insufficiently secure.

Further, at least in some embodiments, temporary or indefinite cell barring may be enabled for the redirecting cell and/or the indicated cell in scenarios in which redirection to an insufficiently secure cell is indicated in a RRC connection rejection message, if desired. For example, the redirecting cell (or a frequency on which the redirecting cell is deployed) may be barred, and/or the indicated cell may be barred, if the indicated cell operates according to a specific radio access technology (e.g., that is considered insecure).

To avoid such scenarios, base stations may additionally or alternatively be configured to determine the cell to which a wireless device is redirected in a RRC connection rejection message based at least in part on the radio access technology of the cell. For example, the base station may choose not to indicate to a wireless device to redirect to a cell that operates according to a radio access technology that is considered insufficiently secure in conjunction with a RRC connection rejection message, e.g., since without having performed authentication with the wireless device, the wireless device may be unable to confirm that the redirection is authorized.

Note further that a wireless device may be configured to ignore unprotected redirection indications (e.g., indications to redirect to an insecure cell that are received with a RRC connection release message prior to authentication or a RRC connection rejection message) internally (e.g., based on configuration information stored in long term/non-volatile memory), or may be so configured based on network signaling (e.g., non-access stratum signaling) from a cellular network with which the wireless device is in communication. For example, if a cellular network is configured to not provide unprotected redirection indications, that cellular network may further configure wireless devices within the network to ignore unprotected redirection indications, since in such a case any unprotected redirection indications may very likely be unauthorized.

Additional Information

The additional description provided herein below is provided as being illustrative of further considerations and possible implementation details of the method of FIG. 5, is are not intended to be limiting to the disclosure as a whole. Numerous variations and alternatives to the details provided herein below are possible and should be considered within the scope of the disclosure.

It is observed from research that LTE NWs can potentially be prone to security threats; for example, it may be possible to exploit certain signaling loopholes present in the system. One example of such a possible signaling loophole could occur when LTE connection release is performed with re-direction to GSM. In LTE, a RRC Connection Release message can carry information for redirection to other frequencies and RATs. Currently, such a release message with redirection can come at any stage of the LTE connection. Thus, such a message could come before security is established, in which case the message may be unprotected. This loophole in an LTE system could result in a third party re-directing wireless devices to a GSM network that does not have as tight security and authentication. Once the device is in the GSM network, the third party may be able to eavesdrop on the user's calls and data. Similar problems may be possible from UMTS to GSM as well, e.g., when a connection release occurs while security activation has not yet occurred, or when a connection reject occurs (which may also occur when security is not activated).

One possible solution for this problem may include not allowing LTE and/or UMTS redirection to GSM before security is activated. With this approach, if a connection release message with redirection to GSM is received before security is activated, UE may discard the redirection message and only honor the release message.

As another approach, when a RRC Connection Release with LTE or UMTS re-direction to GSM is received before security is activated, the device receiving the message will release the connection normally. The device will not, however, redirect to GSM, and will instead stay in LTE or UMTS and perform a cell selection procedure. The cell/frequency on which the RRC connection release message is received may be barred. When it bars that cell/frequency, the device may perform barring as if intraFreqReselection is set to notAllowed.

As still another approach, when a RRC Connection Release with LTE or UMTS re-direction to GSM is received before security is activated, the device receiving the message may declare radio link failure (RLF) and treat this as an invalid configuration. With this approach, after declaring RLF, the device may perform a cell selection for connection re-establishment. In order to not allow the same cell to be selected again, the device may bar the cell and perform barring as if intraFreqReselection is set to notAllowed. In this case the whole frequency may be barred from camping. After selecting a new serving cell, the device may perform a tracking area update (TAU) procedure due to re-establishment and may accordingly re-acquire synchronization with the proper network.

In conjunction with such possible solutions on the device side, it may also be possible to implement one or more modifications to LTE and/or UMTS specification documents to help prevent authorized networks/cells from providing redirection indications to less-secure cells if security has not yet been established. For example, as one possibility, 3GPP TS 36.331 could be modified to specify that a redirectedCarrierInfo field of a RRCConnectionRelease message including redirection information for redirecting a wireless device to a GERAN (and/or to one or more other types of RAN, if desired) should only be permitted after successful security activation. As another (additional or alternative) possibility, as an exception to being unprotected (e.g., being permitted to be sent prior to security activation) more generally, RRCConnectionRelease messages may be indicated as being protected (e.g., cannot be sent prior to security activation) for security and/or privacy purposes if redirectedCarrierInfo to GERAN (and/or to one or more other types of RAN, if desired) is included.

In the following further exemplary embodiments are provided.

One set of embodiments may include a method, comprising: by a wireless device: establishing a radio resource control (RRC) connection with a first cell; receiving a RRC connection release message from the first cell, wherein the RRC connection release message comprises an indication to redirect the wireless device to a second cell; releasing the RRC connection with the first cell; determining whether security has been established with the first cell when the indication to redirect the wireless device to the second cell is received; and selecting a new serving cell based at least in part on whether security has been established with the first cell when the indication to redirect the wireless device to the second cell is received.

According to some embodiments, the second cell is selected if security has been established with the first cell when the indication to redirect the wireless device to the second cell is received, wherein the second cell is not selected if security has not been established with the first cell when the indication to redirect the wireless device to the second cell is received.

According to some embodiments, selecting the new serving cell is further based at least in part on a radio access technology of the second cell.

According to some embodiments, selecting the new serving cell is further based at least in part on security and authentication procedures associated with the second cell.

According to some embodiments, the first cell operates according to LTE or UMTS, and the second cell operates according to GSM.

According to some embodiments, the method further comprises: declaring radio link failure for the first cell if security has not been established with the serving cell when the indication to redirect the wireless device to the second cell is received; and performing a tracking area update with the new serving cell after selecting the new serving cell based at least in part on declaring radio link failure for the first cell.

According to some embodiments, the method further comprises: barring the first cell if security has not been established with the first cell when the indication to redirect the wireless device to the second cell is received.

According to some embodiments, the method further comprises: barring the second cell if security has not been established with the first cell when the indication to redirect the wireless device to the second cell is received.

Another set of embodiments may include a method, comprising: by a wireless device: attempting to establish a radio resource control (RRC) connection with a first cell; receiving a RRC connection reject message from the first cell, wherein the RRC connection reject message comprises an indication to redirect the wireless device to a second cell; and selecting a new serving cell based at least in part on a radio access technology of the second cell, wherein the indication to redirect the wireless device to the second cell is discarded if the second cell operates according to GSM.

A further set of embodiments may include a method, comprising: by a cellular base station configured to provide a first cell: establishing a radio resource control (RRC) connection with a wireless device; determining to release the RRC connection with the wireless device; determining to redirect the wireless device to a second cell when releasing the RRC connection; establishing security with the wireless device prior to releasing the RRC connection with the wireless device based at least in part on determining to redirect the wireless device to the second cell when releasing the RRC connection; and providing a RRC connection release message to the wireless device, wherein the RRC connection release message comprises an indication to redirect the wireless device to the second cell.

According to some embodiments, the second cell operates according to GSM, wherein establishing security with the wireless device prior to releasing the RRC connection with the wireless device is further based at least in part on the second cell operating according to GSM.

A yet further exemplary set of embodiments may include an apparatus, comprising a processing element configured to cause a device to implement any or all parts of the preceding examples.

Another exemplary set of embodiments may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
 a processing element configured to cause a wireless device to:
  establish a radio resource control (RRC) connection with a first cell;
  receive an RRC connection release message from the first cell, wherein the RRC connection release message comprises an indication to redirect the wireless device to a second cell;
  release the RRC connection with the first cell;
  determine whether security has been established with the first cell when the indication to redirect the wireless device to the second cell is received;
  determine whether a stored configuration indicates to ignore indications to redirect to an insecure cell that are received with an RRC connection release message prior to security establishment;
  in response to determining:
   the security has not been established with the first cell when the indication to redirect the wireless device to the second cell is received, and
   the stored configuration indicates to ignore indications to redirect to an insecure cell that are received with an RRC connection release message prior to security establishment,
  ignore the redirection indication and select a new serving cell.

2. The apparatus of claim 1, wherein the second cell operates according to a specific radio access technology (RAT) that is less secure than the RAT of the first cell.

3. The apparatus of claim 1, wherein the second cell is selected when security has been established with the first cell when the indication to redirect the wireless device to the second cell is received.

4. The apparatus of claim 1, wherein selecting the new serving cell is further based at least in part on a radio access technology of the second cell.

5. The apparatus of claim 1, wherein selecting the new serving cell is further based at least in part on security and authentication procedures associated with the second cell.

6. The apparatus of claim 1, wherein the processing element is further configured to cause the wireless device to:
 declare radio link failure for the first cell when security has not been established with the serving cell when the indication to redirect the wireless device to the second cell is received; and
 perform a tracking area update with the new serving cell after selecting the new serving cell based at least in part on declaring radio link failure for the first cell.

7. The apparatus of claim 1, wherein the processing element is further configured to cause the wireless device to:
 bar the first cell when the security has not been established with the first cell when the indication to redirect the wireless device to the second cell is received.

8. The apparatus of claim 1, wherein the processing element is further configured to cause the wireless device to:
 bar the second cell when the security has not been established with the first cell when the indication to redirect the wireless device to the second cell is received.

9. A method, comprising:
 by a wireless device:
  establishing a radio resource control (RRC) connection with a first cell;
  receiving a RRC connection reject message from the first cell, wherein the RRC connection reject message comprises an indication to redirect the wireless device to a second cell;
  releasing the RRC connection with the first cell;
  determining whether security has been established with the first cell when the indication to redirect the wireless device to the second cell is received;
  determining whether a stored configuration indicates to ignore indications to redirect to cells of the specific RAT that are received with a RRC connection reject message prior security establishment;
  in response to determining:
   the security has not been established with the first cell when the indication to redirect the wireless device to the second cell is received, and
   the stored configuration indicates to ignore indications to redirect to cells of the specific radio access technology that are received with an RRC connection reject message prior security establishment,
  ignoring the redirection indication and selecting a new serving cell.

10. The method of claim 9, wherein the second cell operates according to a specific radio access technology (RAT) that is less secure than the RAT of the first cell.

11. The method of claim 10, wherein the wireless device is configured to select the second cell as the new serving cell when the second cell operates according to a second RAT different from the specific RAT.

12. The method of claim 10,
 wherein the specific RAT comprises GSM,
 wherein the second RAT comprises LTE or UMTS.

13. The method of claim 9, wherein selecting the new serving cell is further based at least in part on security and authentication procedures associated with the second cell.

14. The method of claim 9, wherein the method further comprises:
 barring the first cell or a frequency on which the first cell is deployed when the second cell operates according to a specific radio access technology.

15. The method of claim 9, wherein the method further comprises:
 barring the second cell or a frequency on which the second cell is deployed when the second cell operates according to a specific radio access technology.

16. A non-transitory, computer accessible memory medium storing program instructions executable by a processor of a wireless device to cause the wireless device to:
 establish a radio resource control (RRC) connection with a first cell;
 receive an RRC connection release message from the first cell, wherein the RRC connection release message comprises an indication to redirect the wireless device to a second cell;
 release the RRC connection with the first cell;
 determine whether security has been established with the first cell when the indication to redirect the wireless device to the second cell is received;

determine whether a stored configuration indicates to ignore indications to redirect to an insecure cell that are received with an RRC connection release message prior to security establishment;

in response to determining:

the security has not been established with the first cell when the indication to redirect the wireless device to the second cell is received, and the stored configuration indicates to ignore indications to redirect to an insecure cell that are received with an RRC connection release message prior to security establishment, ignore the redirection indication and select a new serving cell.

17. The non-transitory computer accessible memory medium of claim 16, wherein the second cell operates according to a specific radio access technology (RAT) that is less secure than a RAT of the first cell.

18. The non-transitory computer accessible memory medium of claim 16, wherein the second cell is selected when security has been established with the first cell when the indication to redirect the wireless device to the second cell is received.

19. The non-transitory computer accessible memory medium of claim 16, wherein selecting the new serving cell is further based at least in part on a RAT of the second cell.

20. The non-transitory computer accessible memory medium of claim 16, wherein the program instructions are further executable to cause the wireless device to:

declare radio link failure for the first cell when security has not been established with the serving cell when the indication to redirect the wireless device to the second cell is received; and perform a tracking area update with the new serving cell after selecting the new serving cell based at least in part on declaring radio link failure for the first cell.

\* \* \* \* \*